US005712697A

United States Patent [19]
Walton

[11] Patent Number: 5,712,697
[45] Date of Patent: Jan. 27, 1998

[54] PLIABLE SUN SHIELD ACCESSORY FOR EYEGLASSES

[76] Inventor: Derek A. Walton, 2860 Torrey Pines Rd., La Jolla, Calif. 92037

[21] Appl. No.: 620,017

[22] Filed: Mar. 21, 1996

[51] Int. Cl.$^6$ .............. G02C 9/00; G02C 7/10; G02C 1/00
[52] U.S. Cl. .............. 351/47; 351/44; 351/158
[58] Field of Search .............. 351/41, 44, 62, 351/158, 130, 47; 2/435, 13, 12, 10

[56] References Cited

U.S. PATENT DOCUMENTS

| | | | |
|---|---|---|---|
| 2,691,165 | 10/1954 | Kane | 2/13 |
| 3,171,134 | 3/1965 | Kennedy | 2/13 |
| 4,934,807 | 6/1990 | Bollé et al. | 351/62 |
| 5,438,378 | 8/1995 | Blatter | 351/47 |

Primary Examiner—Hung X. Dang
Attorney, Agent, or Firm—Gary L. Eastman, Esq.

[57] ABSTRACT

A Pliable Sun Shield Accessory for Eyeglasses includes a pliable elongated tubular member which is formed with a longitudinal slit. This slit allows the elongated tubular member to be splayed apart for positioning over the top portion of a pair of eyeglasses. An elongated pliable sealing shield is longitudinally mounted on the outer surface of the tubular member. The sealing shield has a mating surface which, when the tubular member is mounted on the eyeglasses, extends towards the eyeglass wearer's forehead. This mating surface is slightly curved which, in combination with its pliable nature, allows the sealing shield to conform snugly to the wearer's forehead. Thus, a pair of eyeglasses equipped with the Pliable Sun Shield Accessory for Eyeglasses prevents light, or other foreign objects, from passing between the wearer's forehead and glasses.

6 Claims, 1 Drawing Sheet

PLIABLE SUN SHIELD ACCESSORY FOR EYEGLASSES

FIELD OF INVENTION

The present invention relates generally to devices used to minimize a person's exposure to the sun. More specifically, the present invention pertains to devices which assist eyeglass wearers in blocking out the sun. The present invention is particularly, though not exclusively, useful as an attachable sun blocking device for use in combination with a pair of ordinary eyeglasses to prevent sunlight from passing between the wearer's forehead and the eyeglasses.

BACKGROUND OF THE INVENTION

As a result of the desire to enjoy the effects of sunshine, many people participate in outdoor activities. The soothing effects of exposure to sunshine, however, may be derogated by the threat of the harmful effects of such exposure to the sun. As a result of such harmful effects, people often take preventative measures to reduce their exposure to the sun. These preventative measures, for example, may include the wearing of sunglasses. Although helpful, sunglasses do little more than prevent the rays of sunshine from shining directly into the eyes of the sunglasses wearer. In fact, if the sun is directly over the sunglasses wearer, a great deal of sunlight may pass between the wearer's forehead and the sunglasses. As a result of the inability for sunglasses to minimize sunlight from entering the sunglasses wearer's eyes, people often wear hats. While the wearing of hats achieves the goal of preventing sunlight from entering the eyes from above the glasses, hats are bulky and impractical in many situations. Consequently, the addition of a visor to sunglasses was invented. Such a device, as disclosed in U.S. Pat. No. 5,438,378, which issued to Blatter for an invention entitled "Visor for Eyeglasses," attaches to the upper frame of a standard pair of glasses to prevent the sunlight from entering the wearer's eyes from above the glasses.

A problem arises, however, when the use of a visor of any sort is prohibited by the activity which the wearer is participating in. Such an activity, for example, might include volleyball, baseball skiing, or any vigorous physical activity which could cause a visor to be displaced or damaged. Moreover, in some activities, the presence of a visor may be not only awkward, but could potentially cause physical harm to the wearer.

Accordingly, it is an object of the present invention to provide an accessory for eyeglasses which prevents light from entering the wearer's eyes from above a pair of eyeglasses, without the use of a visor. It is another object of the present invention to provide an accessory for eyeglasses which is selectively attachable to a pair of eyeglasses. It is a further object of the present invention to provide a sun shield which is easy to attach and remove from a pair of eyeglasses. It is another object of the present invention to provide an accessory for eyeglasses which is capable of being worn during even the most rigorous activities. It is yet another object of the present invention to provide an accessory for eyeglasses which is easy to use, is relatively easy to manufacture, and is comparatively cost effective.

SUMMARY OF THE INVENTION

In accordance with the present invention, a Pliable Sun Shield Accessory for Eyeglasses is provided which includes an elongated tubular member. This tubular member is formed with a longitudinal slit which extends the length of the member. Preferably, the tubular member is formed of a pliable, yet resilient, material. This resiliency allows the longitudinal slit to be expanded in order to receive a portion of the eyeglasses time immediately above the lenses. Moreover, once positioned over the eyeglasses time, the tubular member attempts to return to its original shape, thereby securely attaching itself to the eyeglass time. Additionally, due to its pliable nature, the tubular member may conform with eyeglass flames having a variety of unusual thicknesses, curvatures, and styles.

An elongated pliable sealing shield is longitudinally attached to the outer surface of the tubular member. This shield is substantially the same length of the tubular member and has a thickness which allows it to extend away from the tubular member. Thus, when the tubular member is attached to a pair of eyeglasses, the sealing shield extends towards the forehead of the glasses wearer to create a sun barrier between the forehead and the eyeglasses. Moreover, because the sealing shield is pliable, the shield is capable of conforming snugly to the wearer's forehead, regardless of its particular shape.

The invention as described above overcomes many of the disadvantages of the previous sun-blocking devices. More specifically, the invention prevents any light from passing between a pair of eyeglasses and the wearer's forehead, while avoiding the negative consequences and limitations of having a visor. Also, the Pliable Sun Shield Accessory for Eyeglasses method of attachment is adaptable to virtually any style, shape, or thickness of eyeglasses. Additionally, and perhaps most importantly, the present invention is simple to attach and remove, without the use of rigid plastic clips or brackets that can possibly damage the eyeglasses.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF PREFERRED EMBODIMENTS

Figure 1:
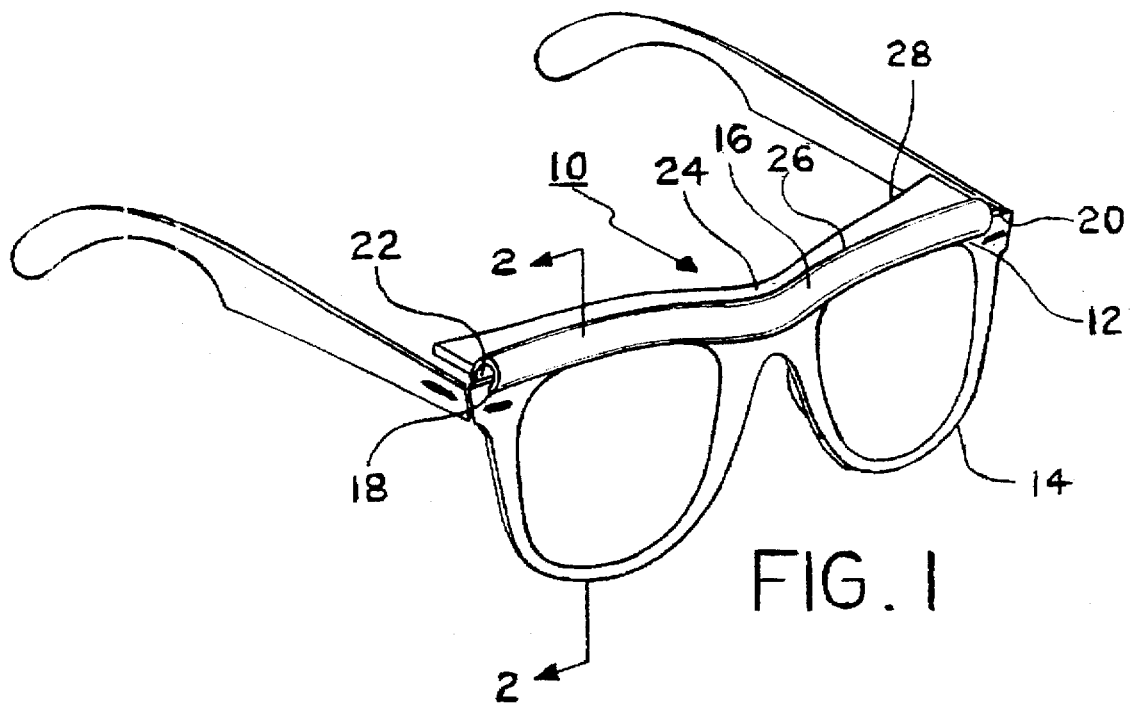
FIG. 1 is a perspective view of the present invention as used in combination with a pair of eyeglasses.

Referring initially to FIG. 1 for an overview, a Pliable Sun Shield Accessory for Eyeglasses in accordance with the present invention is shown as used in cooperation with a pair of eyeglasses, and generally designated 10. More specifically, the sun shield accessory 10 is shown attached to, and extending the length of, the upper frame 12 of the eyeglasses 14. It is to be appreciated that this attachment is achieved by combining the pliable, yet resilient, nature of the tubular member 16, with a longitudinal slit 18. More specifically, this longitudinal slit 18 extends the length of the tubular member 16 and allows the tubular member 16 to be splayed apart. This allows the upper portion 20 of the upper frame 12 to be inserted through the slit 18 and into the cavity 22 formed within the tubular member 16. Once positioned over the upper frame 12, the resilient nature of the tubular member 16 causes it to resume its original shape. As a result of such resiliency, the tubular member 16 securely grips the upper frame 12. Importantly, the tubular member 16 is made of a pliable, yet resilient, material. Thus, it is to be appreciated that the tubular member 16 may be attached to any eyeglasses 14 without the danger of scratching, or otherwise damaging, the eyeglasses 14. The tubular member 16 of the preferred embodiment is constructed from foam rubber Other pliable materials, for example, could include surgical rubber tubing, or any other pliable material well known in the art which will exhibit a degree of resiliency.

Also shown in FIG. 1, the pliable sealing shield 24 attaches longitudinally along the outer surface 26 of the tubular member 16. This longitudinal attachment retains the pliable sealing shield 24 in a position extending away from the tubular member 16 and towards the eyeglass wearer's forehead (not shown). The sealing shield 24 is made of a pliable material. More specifically, the sealing shield of the preferred embodiment is formed from foam rubber. It should be noted, however, that virtually any lightweight material having a pliable characteristic would suffice. The attachment of the pliable sealing shield 24 to the tubular member 16 may be accomplished using an adhesive. In the preferred embodiment, such adhesive is super-glue. It is to be appreciated, however, that any other adhesive well known in the art would suffice.

Sealing shield 24 is originally formed with an exemplary curvature 28. This exemplary curvature 28, however, is merely illustrative of the curvature of a typical wearer's forehead (not shown). It is to be appreciated that due to the pliable nature of the sealing shield 24, virtually any curvature 28 may be established. As a result of the ability of the sealing shield 24 to conform to the wearer's forehead, light is prevented from passing between the eyeglasses 14 and the forehead (not shown). While the blockage of light is one purpose of this invention, it is to be appreciated that the present invention may be used to prevent any material from passing between the eyeglasses 14 and the wearer's forehead (not shown). Such material, for example, could include paint, dust, rain, or any other airborne matter.

Figure 2:
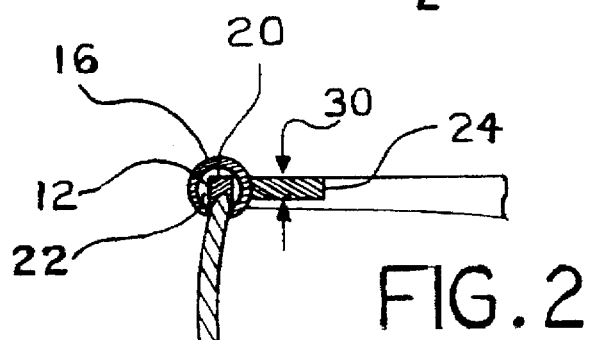
FIG. 2 is a cross-sectional view of the present invention as taken along line 2—2 in FIG. 1.

Referring now to FIG. 2, the upper frame 12 of eyeglasses 14 is shown as inserted into the cavity 22 of the tubular member 16. It is to be appreciated from FIG. 2 that the sun shield accessory 10 of the present invention may be used in cooperation with an eyeglass frame 14 having virtually any thickness or shape. Also, this Figure clearly shows the positioning of the sealing shield 24 in relation to the tubular member 16 and eyeglasses frame 14. Namely, the sealing shield 24 extends rearwards from the eyeglasses frame 14 towards the wearer's forehead (not shown). Note that the sealing shield 24 is shown with a particular thickness 30. The thickness 30 of the sealing shield 24 as shown, however, is merely exemplary. Any other thickness 30 is acceptable, provided the sealing shield 24 is sufficiently rigid to extend rearwards towards the forehead (not shown).

Figure 3:
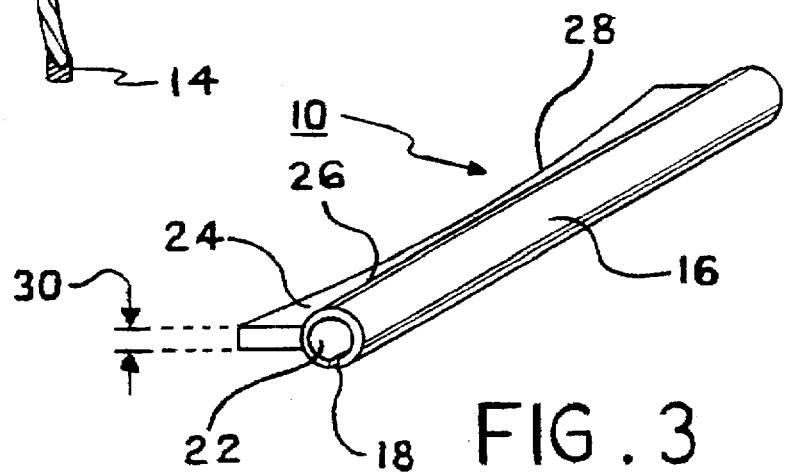
FIG. 3 is a perspective view of the present invention.

Referring now to FIG. 3, the Pliable Sun Shield Accessory for Eyeglasses 10 is shown in perspective. From this view, the elongated tubular member 16, with all of its salient characteristics, is readily observable. More specifically, the elongated tubular member 16 is shown having a longitudinal slit 18 formed along its length. From this view, it is easily appreciated how this longitudinal slit 18 provides access to the cavity 22 which is formed within the tubular member 16. More specifically, it is easily appreciated that when the longitudinal slit 18 is splayed apart, the upper portion 12 of eyeglasses 14 may be inserted within cavity 22. Once the upper portion 12 is inserted, the tubular member attempts to return to its natural form as shown in FIG. 3. As a result of such bias, the tubular member 16 creates an opposing force within longitudinal slit 18 which grips the eyeglasses 14.

Also shown in FIG. 3, the pliable sealing shield 24 is shown extending radially away from the elongated tubular member 16. This sealing shield 24, as mentioned above in connection with FIG. 1, is shown with an exemplary curvature 28. Such curvature 28 is intended to facilitate the mating of the pliable sealing shield 24 with the wearer's forehead. Further, it is to be appreciated that the pliable sealing shield 24 is sufficiently pliable to readily conform to virtually any shape forehead (not shown).

An important feature of the device 10 of the present invention, difficult to show pictorially, is its overall pliable nature. This pliable nature allows the sun shield 10 to be used without fear of personal injury. More specifically, in the event that the eyeglasses 14 shown in FIG. 1 are forced towards the wearer's forehead (not shown), the pliable nature of the sealing shield 24 would absorb much of the shock, thus preventing injury to the wearer. In addition to its safety features, the pliability of the present invention provides for easy and carefree storage of the device 10. When the wearer no longer desires the sun shield 10 to be attached to the eyeglasses 14, the sun shield 10 may be easily removed from the eyeglasses 14 and stored in a pocket, purse, or backpack, without fear of damaging the sun shield accessory 10.

While the particular Pliable Sun Shield Accessory for Eyeglasses as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

I claim:

1. A device, selectively mountable on a pair of eyeglasses having a pair of optical lenses with a frame between them, which comprises:

a pliable elongated member made of foam rubber, said elongated member being substantially tubular and having a first end, a second end, and an outer surface, said elongated member being formed with a longitudinal slit extending from said first end to said second end wherein said elongated member is spreadable at said elongated slit for positioning of said elongated member over said frame of said eyeglasses; and an elongated sealing shield, said elongated sealing shield being longitudinally mounted on said outer surface of said elongated member and extending away therefrom to establish a seal against a person's forehead.

2. A device as recited in claim 1, wherein said elongated member is made from a pliable polymer.

3. A device as recited in claim 1, wherein said elongated sealing shield further comprises a first end, a second end, and a mating surface therebetween, said mating surface facing away from said elongated member, said mating surface having a curvature to mate with a persons forehead and to conform snugly therewith.

4. A device as recited in claim 3, wherein said elongated sealing shield is made of a pliable material.

5. A device as recited in claim 1, wherein said elongated member is sized to extend substantially over said frame of said eyeglasses.

6. A device, selectively mountable on a pair of eyeglasses, said eyeglasses having a pair of optical lenses with a frame between them, which comprises:

a pliable elongated member made of foam rubber, said elongated member being substantially tubular and having a first end, a second end, and an outer surface, said elongated member being formed with a longitudinal slit extending from said first end to said second end wherein said elongated member is spreadable at said elongated slit for positioning of said elongated member over said frame of said eyeglasses; and a pliable elongated sealing shield, said elongated sealing shield being longitudinally mounted on said outer surface of said elongated member and extending away therefrom to establish a resilient seal against a person's forehead.

* * * * *